United States Patent
Pillai et al.

(10) Patent No.: US 9,794,234 B2
(45) Date of Patent: Oct. 17, 2017

(54) PAIRWISE PRE-SHARED KEY GENERATION SYSTEM

(71) Applicant: Cisco Technology, Inc., San Jose, CA (US)

(72) Inventors: Padmakumar Ampady Vasudevan Pillai, Bangalore (IN); Brian Eliot Weis, San Jose, CA (US); Thamilarasu Kandasamy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/810,899

(22) Filed: Jul. 28, 2015

(65) Prior Publication Data

US 2017/0034137 A1 Feb. 2, 2017

(51) Int. Cl.
*H04L 29/06* (2006.01)

(52) U.S. Cl.
CPC ........ *H04L 63/0435* (2013.01); *H04L 63/061* (2013.01)

(58) Field of Classification Search
CPC ............. H04L 63/0435; H04L 63/0464; H04L 63/061; H04L 63/164; H04L 63/0272; H04L 63/065; H04L 9/0827; H04L 9/0833; H04L 9/0866; H04L 9/0891
See application file for complete search history.

(56) References Cited

U.S. PATENT DOCUMENTS

| | | | | |
|---|---|---|---|---|
| 7,234,058 B1* | 6/2007 | Baugher | ............... | H04L 9/0833 380/259 |
| 7,366,894 B1* | 4/2008 | Kalimuthu | .......... | H04L 63/0272 713/153 |
| 7,447,901 B1* | 11/2008 | Sullenberger | ....... | H04L 63/0272 713/153 |
| 8,548,171 B2 | 10/2013 | McGrew et al. | | |
| 8,867,747 B2 | 10/2014 | McGrew et al. | | |
| 2005/0235152 A1* | 10/2005 | Ozaki | .................. | H04L 9/0891 713/170 |
| 2007/0081477 A1* | 4/2007 | Jakkahalli | ........... | H04L 12/4645 370/310 |

(Continued)

OTHER PUBLICATIONS

Blom, Rolf, "An Optimal Class of Symmetric Key Generation Systems," In Advances in Cryptology—EUROCRYPT '84, LNCS 209, pp. 335-338, Jan. 1985.

(Continued)

*Primary Examiner* — Don Zhao
(74) *Attorney, Agent, or Firm* — Edell, Shapiro & Finnan, LLC

(57) ABSTRACT

A Key Generation System (KGS) includes a key server, a first network element, and a second network element. The first and second network elements register with the key server and receive first and second KGS key seeds and first and second KGS identifiers, respectively. The first network element transmits the first KGS identifier to the second network element and obtains the second KGS identifier. The first network element computes a shared key based on the first KGS key seed and the second KGS identifier. The second network element receives the first KGS identifier from the first network element and computes the shared key based on the second KGS key seed and the first KGS identifier.

20 Claims, 8 Drawing Sheets

(56) References Cited

U.S. PATENT DOCUMENTS

| | | | | |
|---|---|---|---|---|
| 2008/0295144 A1* | 11/2008 | Cam-Winget | .......... | H04L 63/08 |
| | | | | 726/1 |
| 2009/0327736 A1* | 12/2009 | Cam-Winget | ........ | H04L 63/061 |
| | | | | 713/181 |
| 2010/0085977 A1* | 4/2010 | Khalid | ................ | H04L 12/4641 |
| | | | | 370/400 |
| 2010/0122338 A1* | 5/2010 | Kataoka | .............. | H04L 61/2015 |
| | | | | 726/12 |
| 2010/0223458 A1* | 9/2010 | McGrew | ............... | H04L 9/0833 |
| | | | | 713/153 |
| 2010/0246829 A1* | 9/2010 | McGrew | ................. | H04L 9/083 |
| | | | | 380/278 |
| 2011/0138185 A1* | 6/2011 | Ju | ........................... | G06F 21/10 |
| | | | | 713/171 |
| 2013/0173910 A1* | 7/2013 | Hong | .................... | H04W 12/04 |
| | | | | 713/153 |

OTHER PUBLICATIONS

Eronen, et al., "Pre-Shared Key Ciphersuites for Transport Layer Security (TLS)," Network Working Group, Standards Track, Request for Comments: 4279, Dec. 2005, pp. 1-15.

Kaufman, et al., "Internet Key Exchange Protocol Version 2 (IKEv2)," Internet Engineering Task Force (IETF), Standards Track, Request for Comments: 5996, Sep. 2010, pp. 1-138.

\* cited by examiner

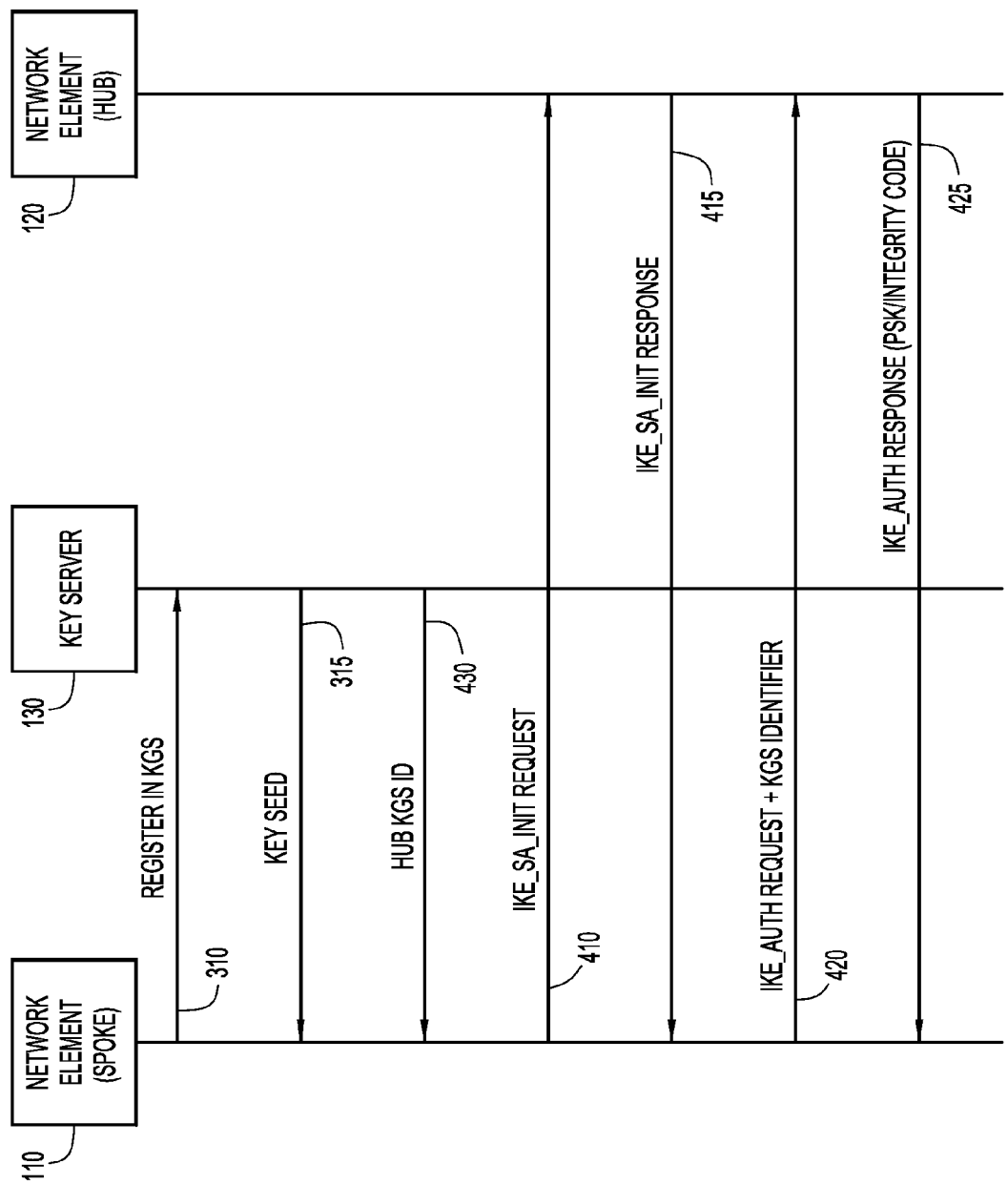

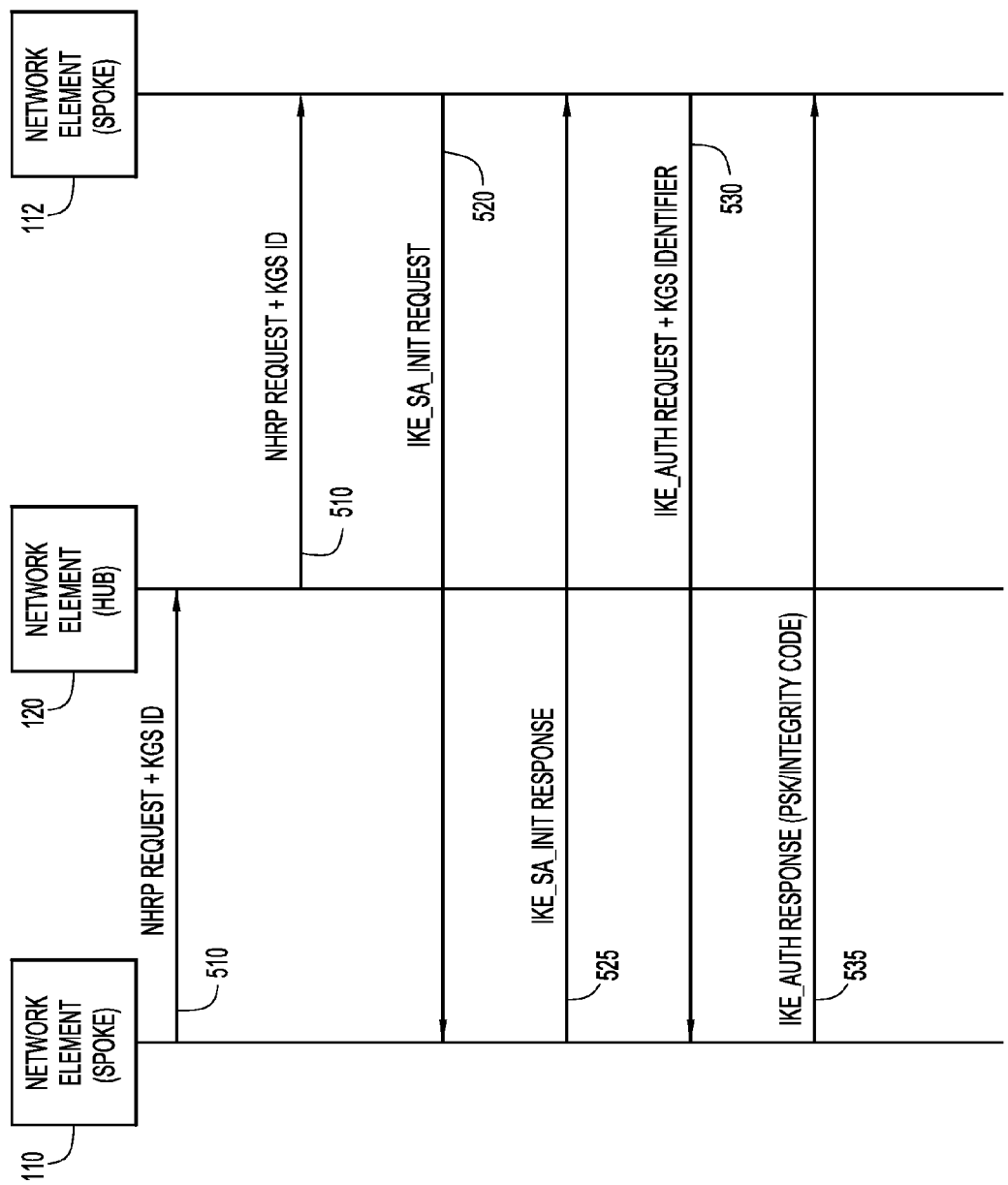

PAIRWISE PRE-SHARED KEY GENERATION SYSTEM

TECHNICAL FIELD

The present disclosure relates to security in computer networks. In particular, the present disclosure relates to the generation of unique pre-shared keys for each pair of network elements in a network.

BACKGROUND

Network elements supporting Virtual Private Networks (VPNs) use robust key management to ensure the security of the communications across the VPNs. VPNs using Internet Key Exchange (IKE) for key management with pre-shared keys involves the configuration of pre-shared keys across all of the network nodes. In a mesh network of N nodes, a total of N*(N−1)/2 pre-shared keys need to be provisioned to ensure uniqueness of the pre-shared keys between any two nodes. Alternatively, administrators will often use group keys for all of the VPN gateways to authenticate each other. This makes revocation of a VPN gateway nearly impossible, as well as allowing any VPN gateway to spoof the identity of another VPN gateway.

Another method of securing the network nodes is with a certificate authority and digital certificates. However, users often do not want to maintain a certificate authority. Compared to the use of a Certificate Authority and digital certificates, the use of pre-shared keys provides a simpler solution for most users.

BRIEF DESCRIPTION OF THE DRAWINGS

FIG. 4B is a diagram showing messages exchanged in authenticating a connection between a spoke network element and a hub network element according to another example embodiment.

FIG. 5 is a diagram showing messages exchanged in authenticating a connection between two spoke network elements using an intermediary hub network element according to an example embodiment.

DESCRIPTION OF EXAMPLE EMBODIMENTS

Overview

The techniques presented herein provide for a computer-implemented method at a first network element, the method comprising registering the first network element with a key server that manages a key generation system (KGS). The first network element receives a KGS key seed and a first KGS identifier associated with the first network element from the key server. The first KGS identifier is transmitted to a second network element, and a second KGS identifier associated with the second network element is obtained. The first network element computes a shared key based on the KGS key seed and the second KGS identifier.

Example Embodiments

One method of generating a mesh of pairwise keys for a plurality of network elements is described by Blom's Symmetric Key Generation System. This Key Generation System (KGS) allows for the generation of shared keys between any two network nodes out of an N-node network without having to pre-generate all N*(N−1)/2 keys necessary to ensure uniqueness. Each node generates a key for each of the other nodes on demand, based on the public identifiers of the other nodes.

The techniques presented herein provide a method to use Blom's KGS to generate pre-shared secret keys between any two network nodes based on KGS identities that are carried in an IKE version two (IKEv2) exchange. In one example, IKEv2 AUTH exchanges would carry the public identities and an indication of the authentication method, e.g., a KGS. Alternatively, a peer introduction exchange prior to the IKE exchange may carry the KGS identities of the two network nodes to each other.

A centralized key management system coordinates the KGS through a key server. All of the network nodes in the secure network register with the key server and receive a key seed based on the individual node's KGS identifier. The KGS identifier may be assigned by the key server or provided by the node itself, but it needs to be unique among the network elements in the secure network. If the identifiers for the nodes are generated by the key server, the key server should keep the corresponding mapping to support rekeying of the network nodes.

Both of the network elements/nodes independently compute the "pre-shared" key based on their own secret key seed provided by the key server and the other network element's KGS identifier. Blom's method algorithmically links each network element's key seed with its KGS identifier, such that two nodes compute the same key based on the key seed from one node and the KGS identifier from the other node.

Figure 1:
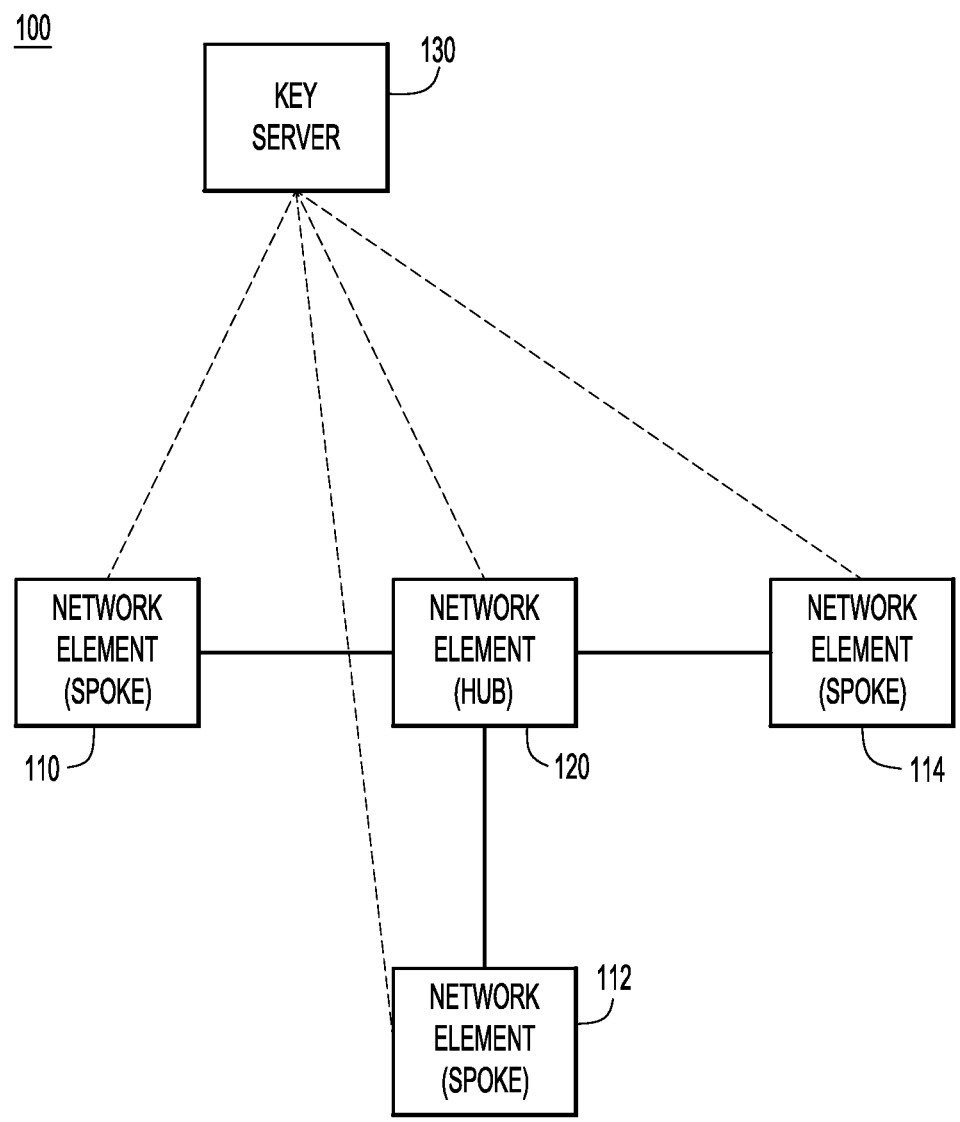
FIG. 1 is a system block diagram showing network elements in a secure network according to an example embodiment.

Referring now to FIG. 1, a simplified block diagram of a secure network 100 is shown. Network 100 comprises a plurality of network elements 110, 112, 114, and 120, and a key server 130. In one example, the network elements are arranged in a hub and spoke configuration with network elements 110, 112, and 114 positioned as spokes around the hub network element 120. Each of the network elements communicates with key server 130 to coordinate the generation of shared keys, as described herein. Spoke network elements 110, 112, and 114 typically may communicate with hosts outside of the secure network. Hub network element 120 will typically only communicate with network elements within the secure network, but may also be configured to communicate with hosts outside the secure network.

In one example, network elements 110, 112, 114, and 130 may be, for example, a switch or router in a variety of types of networks (e.g., any combination of Internet, intranet, local area network (LAN), wide area network (WAN), wired network, wireless network, etc.) that connects computing devices (not shown in FIG. 1). Key server 130 may be a computing device, e.g., desktop computer, laptop computer, server, virtual machine on a hypervisor, tablet computer, tablet, smart phone, etc., that computes key seeds for each of the network elements according to Blom's algorithm.

FIG. 1 shows only four network elements arranged in a hub and spoke configuration. However, the secure network 100 may comprise any number of network elements in any configuration to use the techniques described herein. For example, the network 100 may comprise a fully or partially meshed network of a plurality of network elements in which none of the network elements is a hub. Alternatively, multiple hub network elements may be included in the configuration of the network.

Figure 2:
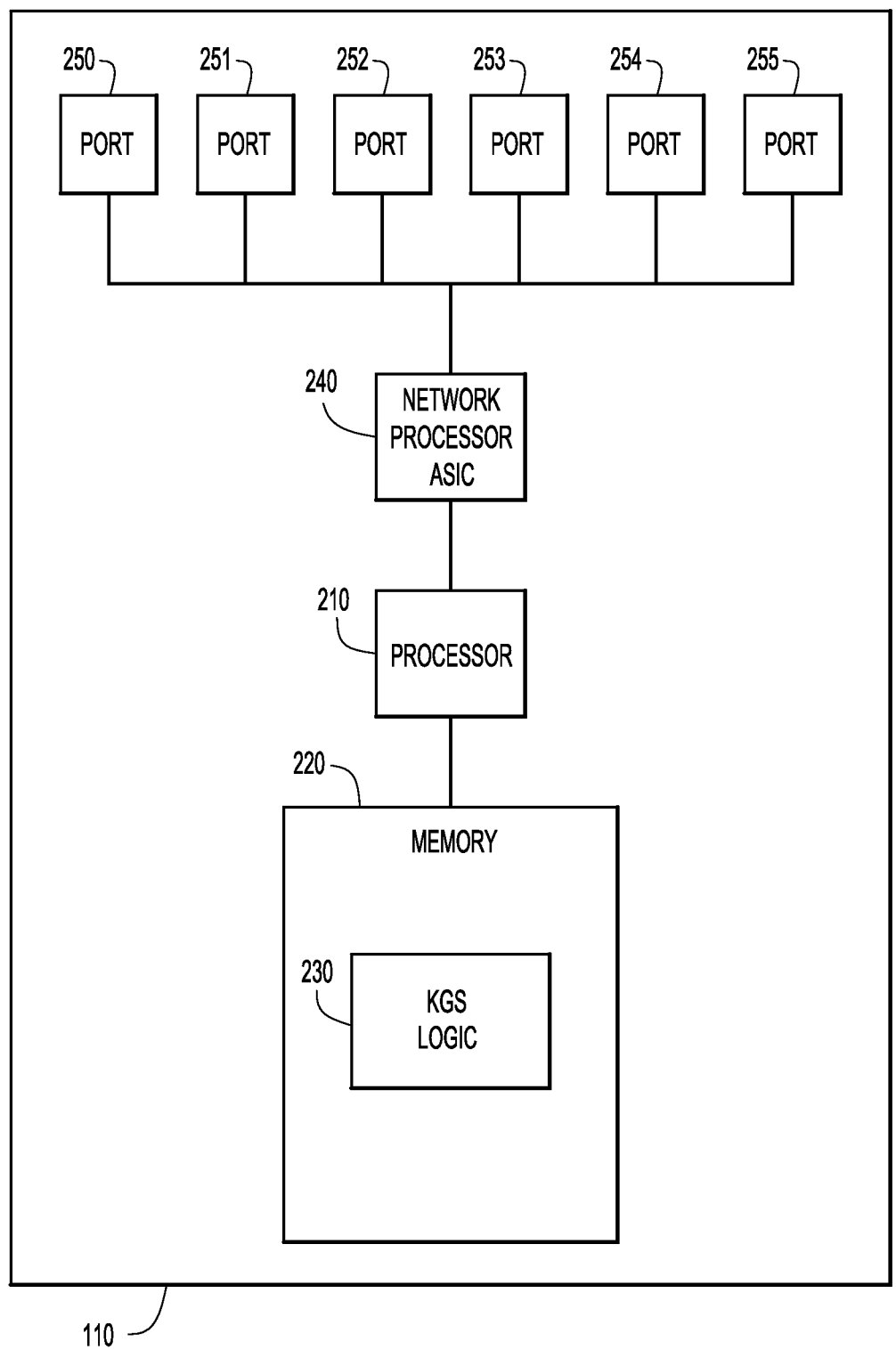
FIG. 2 is a simplified block diagram of a network device according to an example embodiment.

Referring now to FIG. 2, a simplified block diagram of a network device 110 configured to perform the techniques presented herein is shown. Network device 110 is used as an example, and network devices 112, 114, and 120 may have similar configurations. Network device 110 includes, among other possible components, a processor 210 to process instructions relevant to securely processing communication packets, and memory 220 to store a variety of data and software instructions (e.g., KGS logic 230, communication packets, etc.). The network device 110 also includes a network processor application specific integrated circuit (ASIC) 240 to process communication packets that flow through the network element 110. Network processor ASIC 240 processes communication packets be sent to and received from ports 250, 251, 252, 253, 254, and 255. While only six ports are shown in this example, any number of ports may be included in network element 110.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software (e.g., the KGS logic 230) is executed (by the processor 210) it is operable to perform the operations described herein.

Figure 3:
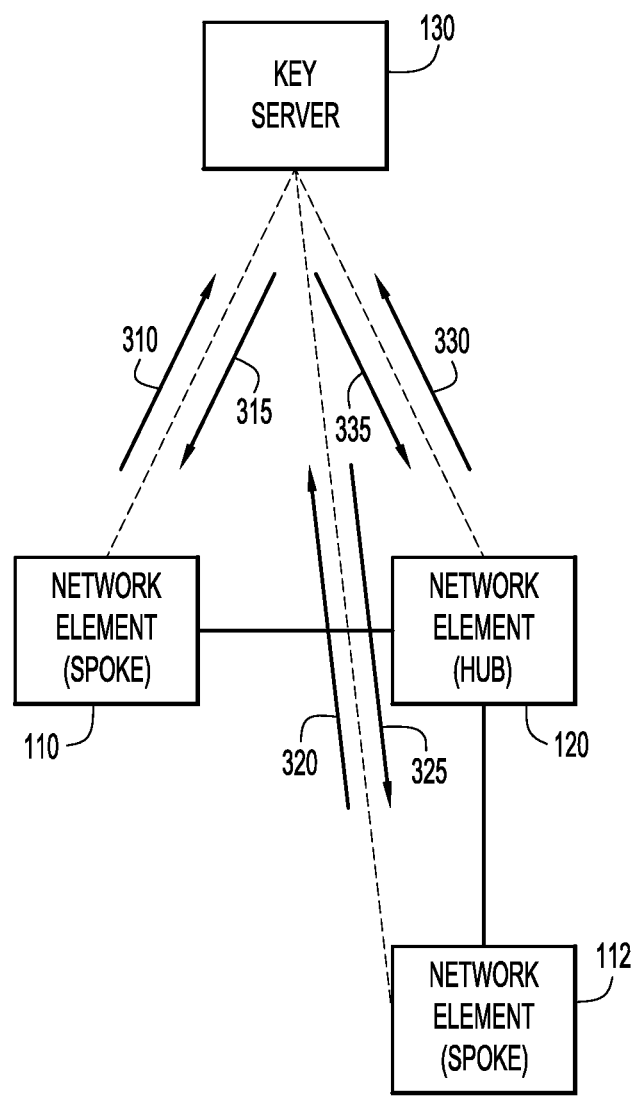
FIG. 3 is a diagram showing messages exchanged in the registering with a key server according to an example embodiment.

Referring now to FIG. 3, a system diagram shows messages involved in registering each of the network elements with the key server 130. Network element 110 sends a message 310 to the key server indicating that the network element 110 will participate in the KGS. The key server 130 responds with message 315 that includes a key seed specific to the network element 110. Similarly, network element 112 sends message 320 to the key server 130 registering it in the KGS, and receives message 325 from the key server 130 with the key seed specific to the network element 112. Network element 120 sends message 330 to the key server 130 registering it in the KGS, and receives message 335 from the key server 130 with the key seed specific to the network element 120.

In one example, the KGS identifier for each network element 110, 112, and 120 is determined by the key server 130, and included in the response messages 315, 325, and 335, respectively. Alternatively, the individual network elements 110, 112, and 120 may determine their own KGS identifier and include it in the request messages 310, 320, and 330, respectively. Additionally, the key server 130 may include the KGS identifier of the hub network element 120 in the response messages 315 and 325 to the spoke network elements 110 and 112, respectively. Since a hub and spoke network configuration includes relatively few hub network elements, there is relatively little performance issues with the spokes storing the KGS identifiers for the hub network elements.

Figure 4A:
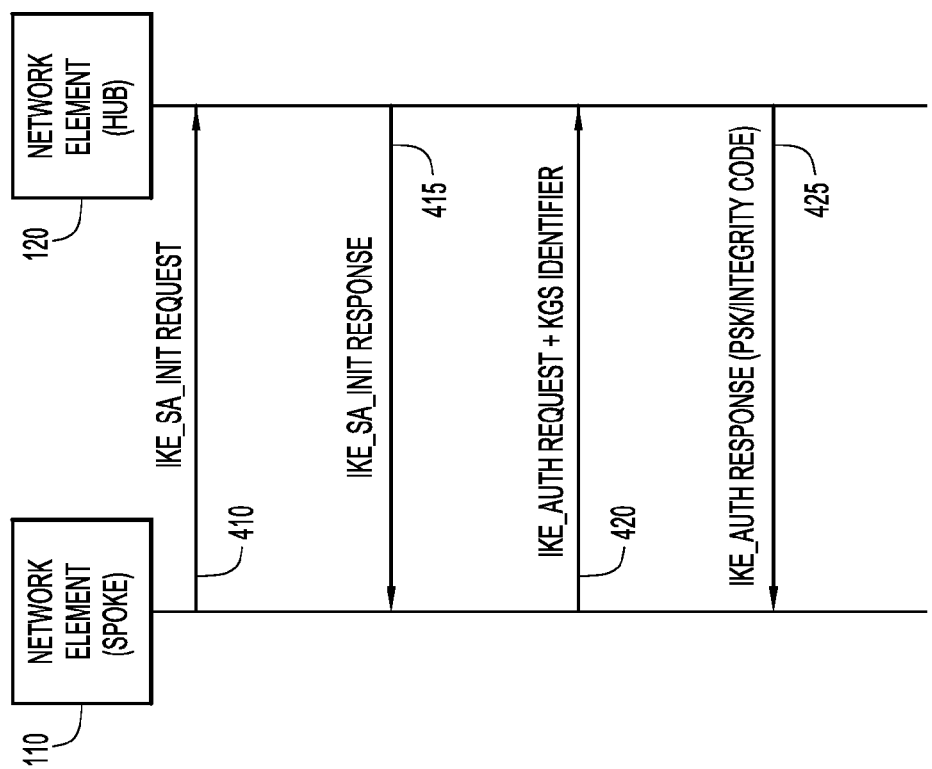
FIG. 4A is a diagram showing messages exchanged in authenticating a connection between a spoke network element and a hub network element according to an example embodiment.

Referring now to FIG. 4A, a ladder diagram shows messages involved in determining a pre-shared key between a hub network element 120 and a spoke network element 112 according to one example. The spoke network element 110 initiates a security association using IKEv2 with an initial message 410 (IKE_SA_INIT request). The hub network element 120 responds to the initial message 410 with a response 415 (IKE_SA_INIT response). The spoke network element 110 then sends the IKEv2 authentication message 420, which includes the KGS identifier of the spoke element 110 and authentication data computed from the pairwise pre-shared key that is unique to this pair of network elements. The spoke network element 110 may compute the pre-shared key using its key seed and the KGS identifier of the hub network element 120. The hub network element 120 combines the KGS identifier of the spoke network element 110 with the key seed previously obtained from the key server to generate the pre-shared key. The hub network element 120 then responds with the authentication response message 425 including authentication data computed from the pre-shared key (PSK). In this example, the spoke network element 110 has been pre-configured with the KGS identifier of the hub network element 120. If the authentication data that the spoke network element 110 receives in message 425 matches the authentication data computed from the pre-shared key based on the stored KGS identifier of the hub network element 120 and the key seed that the spoke network element 110 received from the key server, then the pair of network elements have been authenticated to each other.

In one example, the initial messages 410 and 415 include parameters to encrypt subsequent communications between the network elements 110 and 120. The authentication messages 420 and 425 are used to ensure that the two network elements are authenticated to each other based on the computed pre-shared key. The authentication data computed from the pre-shared key may comprise a shared key message integrity code as proof that each of the network elements has stored the same pre-shared key.

In another example, the Internet Protocol (IP) address of each network element may be used as the KGS identifier. In this example, the key seeds provided by the key server 130 are generated for each network element using the same IP address that the network element will use as its KGS identifier. This example is best used with network elements with static IP addresses, as dynamic IP addresses (e.g., assigned by Dynamic Host Configuration Protocol (DHCP)) may adversely affect the algorithmic link between the KGS key seeds and the KGS identifiers. Similarly, the presence of Network Address Translation (NAT) services in the network may affect the KGS.

Referring now to FIG. 4B, a ladder shows messages involved in determining a pre-shared key between a hub network element 120 and a spoke network element 110 according to an example in which the key server 130 informs the spoke network element 110 of the KGS identifier of the hub network element 120. The spoke network element 110 registers in the KGS by sending message 310 to the key server 130. The key server 130 responds with a key seed specific to the spoke network element 110 in message 315. The key server 130 also provides the KGS identifier of the hub network element 120 to the spoke network element 110 in message 430. In another example, a separate server (not shown), other than the key server 130, may provide the KGS identifiers to the network elements 110 and 120.

After the spoke network element 110 has received the KGS identifier of the hub network element 120 in message 430, the spoke network element 110 may continue with the IKEv2 messaging shown in FIG. 4A. The spoke network element 110 and the hub network element 120 exchange initialization messages 410 and 415 to establish a secure channel. The spoke network element 110 sends the authentication message 420 along with the KGS identifier of the spoke network element 110. The hub network element computes the pre-shared key and completes the authentication exchange with message 425 including the message integrity code computed from the pre-shared key.

Dynamic Multipoint VPN uses Next Hop Resolution Protocol (NHRP) to resolve the network address of remote nodes. NHRP uses resolution request and resolution reply messages to resolve the remote nodes network address. Since network connections directly between two spokes have not been established, the resolution request would take a spoke-hub-spoke path. The NHRP initiator includes its own network address in the resolution request for the NHRP responder to create the necessary mapping and respond back with the resolution reply. The resolution reply would carry the NHRP responder's network address for the NHRP initiator to update its mappings and create a direct connection back to the NHRP responder. To provide security for the direct spoke-spoke path, the spoke network elements may create a security association using a key management protocol like IKEv2.

Referring now to FIG. 5, a ladder diagram shows messages involved in determining a pre-shared key between two spoke network elements using the NHRP resolution messages. The spoke network element 110 sends an NHRP resolution request 510 to the hub network element 120, and includes the KGS identifier for the spoke network element 110. The hub network element 120 forwards the NHRP resolution request 510 to the appropriate spoke network element 112, including the KGS identifier for the spoke element 110. Since the NHRP resolution request includes the network address for spoke network element 110, the spoke network element can initiate an IKEv2 exchange directly with the spoke network element 110.

The spoke network element 112 initiates the IKEv2 exchange by sending message 520 to the spoke network element 110. The spoke network element 110 completes the initial exchange by responding with message 525 to the spoke network element 112. The spoke network element 112 sends an authentication message 530, which includes the KGS identifier of the spoke network element 112 to the spoke network element 110 and authentication data computed from the pairwise pre-shared key that is unique to this pair of network elements. Using the KGS identifier for the spoke network element 112 and the key seed previously obtained by the spoke network element 110 (e.g., when registering with the key server 130), the spoke network element 110 computes the pre-shared key and a message integrity code, and completes the authentication exchange with message 535 including the message integrity code. The spoke network element 112 computes the pre-shared key from the KGS identifier for the spoke network element 110 that was included with the NHRP resolution request 510 and the key seed that was previously obtained by the spoke network element 112.

In one example, as part of a centralized management policy, the key server 130 may request that network elements periodically re-authenticate their peers. This may be triggered by the key server 130 as a re-keying indication.

The key server 130 may generate a new KGS identifier and key seed for each network element as part of the re-keying exchange. This will force the network elements to re-authenticate its peers and regenerate a new pre-shared key for each peer. If a network element is blocked by the key server 130, i.e., it is not given a new key seed and/or KGS identifier, then any connection with the blocked network element would automatically by blocked, since the pre-shared key computed using the now-invalid key seed/KGS identifier would not match the pre-shared key generated by an updated key seed/KGS identifier. This enables a centralized management of policies from the controller for the management of the network, while also ensuring the privacy of the session keys between any two network elements.

Figure 6:
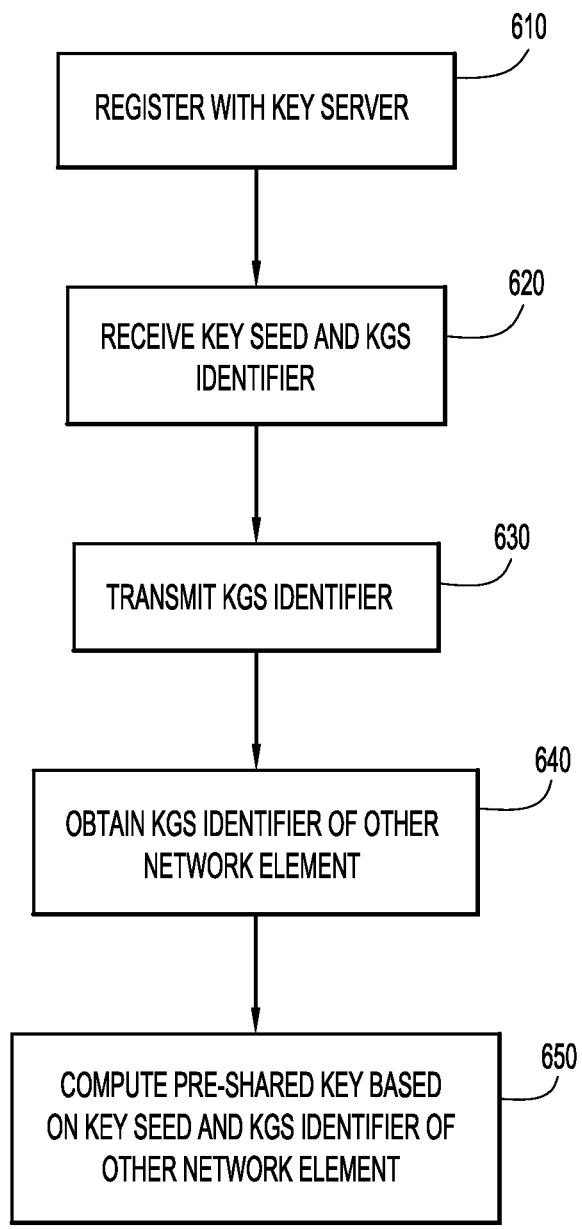
FIG. 6 is a flowchart showing the operations of a spoke network element acquiring a pairwise key with another network element according to an example embodiment.

Referring now to FIG. 6, a flowchart is shown for a process 600 in which a spoke network element generates a pre-shared key according to one example. In step 610, the spoke network element registers with a key server that is coordinating a KGS. The spoke network element receives a key seed from the key server along with a KGS identifier in step 620. The key seed is algorithmically linked to the KGS identifier, e.g., according to Blom's algorithm. In step 630, the spoke network element transmits its KGS identifier to another network element. The KGS identifier may be transmitted to a hub network element (e.g., as part of an IKEv2 authentication exchange) or to another spoke network element through a hub network element (e.g., a part of an NHRP resolution request).

In step 640, the spoke network element obtains a KGS identifier of the other network element. The KGS identifier may be obtained because it is preconfigured in the spoke network element (e.g., the KGS identifiers of hub network elements). Alternatively, the spoke network element may obtain the KGS identifier of the other network element from an outside source (e.g., the key server). The spoke network element computes the pre-shared key in step 650. The pre-shared key is computed based on the key seed obtained from the key server in step 620 and the KGS identifier of the other network element obtained in step 640. The computed pre-shared key may now be used to complete an authentication exchange between the spoke network element and the other network element.

Figure 7:
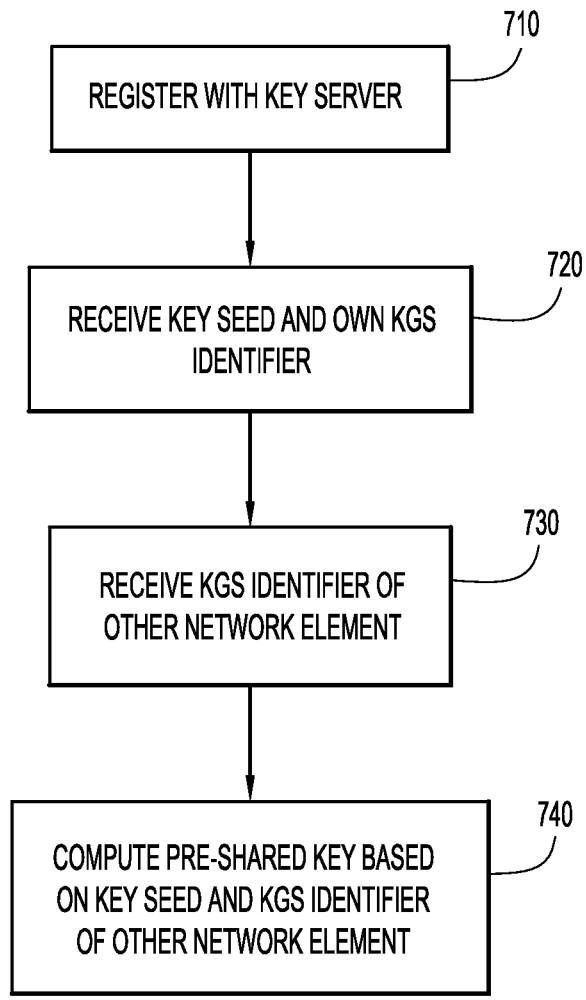
FIG. 7 is a flowchart showing the operations of a hub network device acquiring a pairwise key with another network element according to an example embodiment.

Referring now to FIG. 7, a flowchart is shown for a process 700 in which a hub network element generates a pre-shared key, according to one example. In step 710, the hub network element registers with a key server that is coordinating a KGS. The hub network element receives a key seed from the key server along with a KGS identifier in step 720. The key seed is algorithmically linked to the KGS identifier, e.g., according to Blom's algorithm. In step 730, the hub network element receives the KGS identifier of another network element (e.g., a spoke network element). In one example, the hub network element receives the KGS identifier of the other network element as part of an IKEv2 authentication exchange.

The hub network element computes the pre-shared key in step 740. The pre-shared key is computed based on the key seed obtained from the key server in step 720 and the KGS identifier of the other network element received in step 730. The computed pre-shared key may now be used to complete an authentication exchange between the hub network element and the other network element.

The pre-shared key described above has been described in the context of an IKEv2 exchange, but other security schemes that use a pre-shared key may also use the described procedures to generate pairwise pre-shared keys.

In one example, pre-shared key ciphersuites may be used for Transport Layer Security (TLS) sessions. In an example of a pre-shared key, the premaster secret is formed from a pre-shared key that is M octets in length. The premaster secret may be formed by concatenating an unsigned integer with a value M, M zero octets, a second unsigned integer with a value M, and the pre-shared key. By modifying the ServerKeyExchange and ClientKeyExchange to carry the KGS identifiers, the pairwise pre-shared keys may be generated as described above and used to form the premaster secret in a TLS session.

In summary, the techniques described herein extend Blom's algorithm to generate IKE pre-shared secrets between an initiator node and a responder node by carrying the KGS identifier of the initiator in the IKEv2 authentication exchange. A centralized key management system is used to distribute to each node its KGS key seed, and all group members register with the key server to securely obtain the key seed. This requires the IKEv2 initiator to have learned the KGS identifier for the IKEv2 responder in advance using one of several mechanisms. This may be resolved for spoke-spoke connections using NHRP. For spoke-hub connections, the hub's KGS identifier may be preconfigured in the spoke, or the information may be downloaded from the key server. Blom's algorithm may be similarly extended to provide an efficient way to provide dynamic pre-shared keys for ciphersuites in Transport Layer Security (TLS) sessions. In one example, the KGS identities may be carried in the ServerKeyExchange and ClientKey Exchange messages setting up the TLS session. The authentication information (e.g., message integrity code) may be carried in the Finished exchange setting up the TLS session.

In one form, the techniques presented herein provide for a computer-implemented method performed at a first network element, the method including registering the first network element with a key server that manages a key generation system (KGS). The first network element receives a KGS key seed and a first KGS identifier associated with the first network element from the key server. The first KGS identifier is transmitted to a second network element, and a second KGS identifier associated with the second network element is obtained. The first network element computes a shared key based on the KGS key seed and the second KGS identifier.

In another form, the techniques presented herein provide for a computer-implemented method performed at a second network element, the method including registering the second network element with a key server that manages a key generation system (KGS). The second network element receives a KGS key seed and a second KGS identifier associated with the second network element from the key server. The second network element receives a first KGS identifier associated with a first network element and computes a shared key based on the KGS key seed and the first KGS identifier.

In yet another form, the techniques presented herein provide for a system comprising a key server, a first network element, and a second network element. The key server is configured to send a first KGS key seed and a first KGS identifier to the first network element in response to receiving a first registration request from the first network element. The key server is also configured to send a second KGS key seed and a second KGS identifier to the second network element in response to receiving a second registration request from the second network element. The first network element is configured to transmit the first KGS identifier to the second network element and obtain the second KGS identifier. The first network element is also configured to compute a shared key based on the first KGS key seed and the second KGS identifier. The second network element is configured to receive the first KGS identifier from the first network element and compute the shared key based on the second KGS key seed and the first KGS identifier.

The above description is intended by way of example only. Various modifications and structural changes may be made therein without departing from the scope of the concepts described herein and within the scope and range of equivalents of the claims.

What is claimed is:

1. A method comprising:
   registering a first network element with a key server that manages a key generation system (KGS);
   receiving a KGS key seed and a first KGS identifier associated with the first network element from the key server;
   transmitting the first KGS identifier to a second network element;
   obtaining a second KGS identifier associated with the second network element; and
   computing a shared key based on the KGS key seed and the second KGS identifier.

2. The method of claim 1, wherein the KGS comprises a symmetric key generation system based on Blom's algorithm.

3. The method of claim 1, further comprising establishing a security association between the first network element and the second network element based on the shared key.

4. The method of claim 3, wherein the first KGS identifier is transmitted to the second network element by way of an intermediary network element and the security association is established directly between the first network element and the second network element without communication with the intermediary network element.

5. The method of claim 1, wherein the first KGS identifier is transmitted in an Internet Key Exchange version 2 (IKEv2) AUTH message.

6. The method of claim 1, wherein the first KGS identifier is transmitted to the second network element by way of an intermediary network element.

7. The method of claim 6, wherein the second KGS identifier is obtained from the key server.

8. A method comprising:
   registering a second network element with a key server that manages a key generation system (KGS);
   receiving a KGS key seed and a second KGS identifier from the key server, the second KGS identifier being associated with the second network element;
   receiving at the second network element, a first KGS identifier associated with a first network element; and
   computing a shared key based on the KGS key seed and the first KGS identifier.

9. The method of claim 8, wherein the KGS comprises a symmetric key generation system based on Blom's algorithm.

10. The method of claim 8, further comprising establishing a security association between the first network element and the second network element based on the shared key.

11. The method of claim 8, wherein the first KGS identifier is transmitted in an Internet Key Exchange version 2 (IKEv2) AUTH message.

12. The method of claim 8, wherein the first KGS identifier is obtained from the key server.

13. A system comprising:
a key server in a key generation system (KGS), the key server comprising a microprocessor configured to:
send a first KGS key seed and a first KGS identifier to a first network element in response to receiving a first registration request from the first network element; and
send a second KGS key seed and a second KGS identifier to a second network element in response to receiving a second registration request from the second network element;
the first network element configured to:
transmit the first KGS identifier to the second network element;
obtain the second KGS identifier; and
compute a shared key based on the first KGS key seed and the second KGS identifier; and
the second network element configured to:
receive the first KGS identifier from the first network element; and
compute the shared key based on the second KGS key seed and the first KGS identifier.

14. The system of claim 13, wherein the KGS comprises a symmetric key generation system based on Blom's algorithm.

15. The system of claim 13, wherein the first network element and the second network element are further configured to establish a security association based on the shared key.

16. The system of claim 13, wherein the first network element is configured to transmit the first KGS identifier in an Internet Key Exchange version 2 (IKEv2) AUTH message.

17. The system of claim 13, wherein the second KGS identifier is obtained from the key server.

18. The system of claim 13, further comprising an intermediary network element configured to relay the first KGS identifier from the first network element to the second network element.

19. The system of claim 18, wherein the first network element and the second network element establish a security association based on the shared key without communication with the intermediary network element.

20. The system of claim 18, wherein the first network element is configured to transmit the first KGS identifier in a Next Hop Resolution Protocol (NHRP) request to the intermediary network element.

* * * * *